(12) United States Patent
Kawabuchi et al.

(10) Patent No.: US 8,411,331 B2
(45) Date of Patent: Apr. 2, 2013

(54) IMAGE SCANNING APPARATUS, COMPUTER READABLE MEDIUM, IMAGE MANAGEMENT SYSTEM, AND IMAGE MANAGEMENT METHODS

(75) Inventors: Masashi Kawabuchi, Kahoku (JP); Kiyoto Kosaka, Kahoku (JP)

(73) Assignee: PFU Limited, Kahoku-shi, Ishikawa (JP)

( * ) Notice: Subject to any disclaimer, the term of this patent is extended or adjusted under 35 U.S.C. 154(b) by 603 days.

(21) Appl. No.: 12/509,243

(22) Filed: Jul. 24, 2009

(65) Prior Publication Data

US 2010/0020368 A1   Jan. 28, 2010

(30) Foreign Application Priority Data

Jul. 28, 2008   (JP) ................................. 2008-192927

(51) Int. Cl.
  *H04N 1/04*   (2006.01)
(52) U.S. Cl. ......... 358/474; 358/497; 358/498; 358/448
(58) Field of Classification Search .................. 358/474, 358/497, 498, 448, 444
  See application file for complete search history.

(56) References Cited

U.S. PATENT DOCUMENTS

| 2003/0137496 | A1* | 7/2003 | Stevens et al. | 345/173 |
| 2009/0001710 | A1* | 1/2009 | Wicker | 283/117 |

FOREIGN PATENT DOCUMENTS

| JP | 05-242299 | | 9/1993 |
| JP | 2003-346153 | | 12/2003 |
| JP | 2004-080601 | | 3/2004 |
| JP | 2005-057405 | | 3/2005 |
| JP | 2006-331111 | | 12/2006 |
| JP | 2007-163755 | | 6/2007 |
| JP | 2008-040962 | | 2/2008 |
| JP | 2008-041045 | * | 2/2008 |
| JP | 2008-046796 | | 2/2008 |
| JP | 2008-054084 | | 3/2008 |
| JP | 2008-109338 | | 5/2008 |

OTHER PUBLICATIONS

Japanese Office Action—JP2008-192927 (corresponding foreign application)—Mar. 14, 2012 [English Translation].
"Amazing!, Simple!, Can be carried on!, Method for fully exploiting a desk-top scanner", Nikkei PC21, vol. 12, No. 9, Japan, Nikkei Business Publications Inc., May 1, 2007, pp. 118-120.
Japan Patent Office, Office Action, JP2008-192927 (corresponding application in Japan), mailed May 30, 2012.
Nikkei Business Publications,Inc., May 1, 2007, vol. 12, No. 9, pp. 118-120.
Japan Patent Office, Office Action, JP2008-192927 (corresponding application in Japan), mailed Aug. 15, 2012 [English Translation].
Kouichi Oikawa, "Public presentation of an on-line character database containing writing pressure information and an on-line character recognition method by using writing pressure information", vol. 102, No. 55, IEICE Technical Report The Institute of Electronics, Information and Communication Engineers. vol. 102, No. 55 pp. 39-44, May 10, 2002.

* cited by examiner

*Primary Examiner* — Houshang Safaipour
(74) *Attorney, Agent, or Firm* — Hogan Lovells US LLP (57) ABSTRACT

An image scanning apparatus includes a scanning unit that scans an image from an image display medium optically and creates image data; a data comparison unit that compares the image data scanned by the scanning unit and image data recorded in a predetermined recording region; and a notification unit that notifies an operator depending on a result of comparison by the data comparison unit.

11 Claims, 9 Drawing Sheets

| Thumbnail image (to be compared) | Scanned image |
|---|---|
| S00001.jpg | 00001.jpg |
| S00002.jpg | 00002.jpg |
| . . . | . . . |

Image database 410

FIG.6A　Ordinary thumbnail display
(when no matching image is found)

FIG.6B　Highlighted display of matching images
(when a matching image is found)

Image management system

FIG.9

IMAGE SCANNING APPARATUS, COMPUTER READABLE MEDIUM, IMAGE MANAGEMENT SYSTEM, AND IMAGE MANAGEMENT METHODS

CROSS-REFERENCE TO RELATED APPLICATION

This application is based on and claims priority under 35 USC 119 from Japanese Patent Application No. 2008-192927 filed Jul. 28, 2008.

BACKGROUND OF THE INVENTION

1. Field of the Invention

The present invention relates to an image management method.

SUMMARY OF THE INVENTION

According to an aspect of the invention, there is provided an image scanning apparatus includes a scanning unit that scans an image from an image display medium optically and creates image data; a data comparison unit that compares the image data scanned by the scanning unit and image data recorded in a predetermined recording region; and a notification unit that notifies an operator depending on a result of comparison by the data comparison unit.

BRIEF DESCRIPTION OF THE DRAWINGS

Exemplary embodiments of the present invention will be described in detail based on the following figures, wherein.

DETAILED DESCRIPTION

[System Constitution]

First, the overall constitution of an image management system 1 will be described below.

Figure 1:
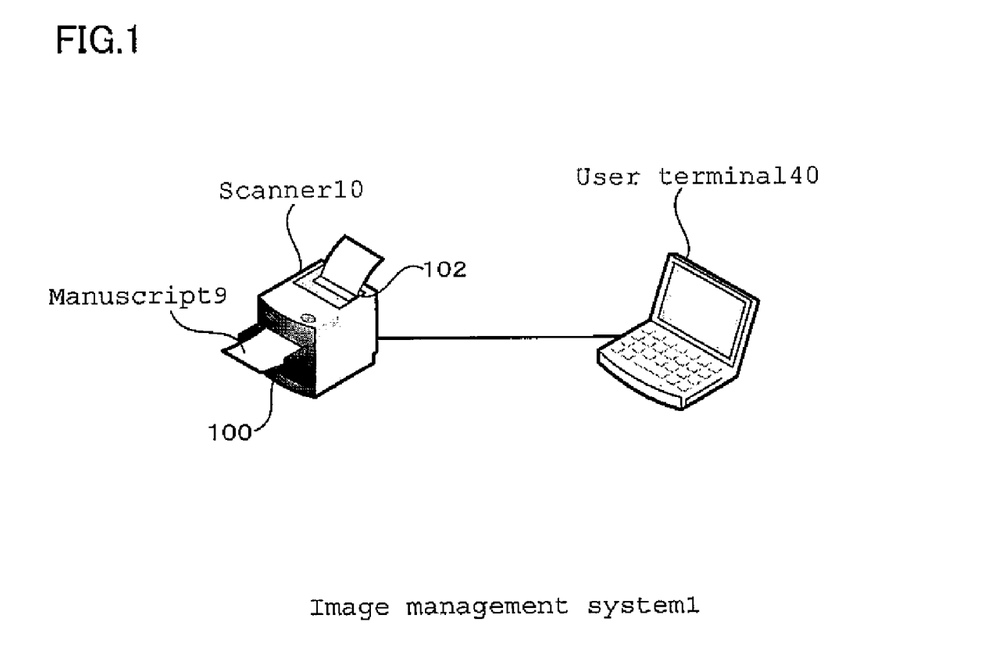
FIG. 1 is an illustration by example of a system constitution of an image management system 1.

FIG. 1 is an illustration by example of the system constitution of the image management system 1.

As illustrated in FIG. 1, the image management system 1 includes a scanner 10 and a user terminal 40.

The scanner 10 is one example of the image scanning apparatus and optically scans a manuscript image displayed on a manuscript 9 (image display medium).

The scanner 10 of the present example has an automatic feeder 100 which feeds each sheet of paper of a manuscript 9 to a scanning position and a discharge outlet 102 through which the manuscript 9 whose images have been scanned completely is discharged, and transmits the data of the images scanned from the manuscript 9 to the user terminal 40.

The user terminal 40 is a computer terminal which is operated by the user (operator). The user terminal 40 of the present example is connected to the scanner 10 via a communication line such as a USB cable and so can send a user instruction to the scanner 10.

The image management system 1 of the present example manages the data of the images scanned from the manuscript 9 by using such a system constitution. In particular, if the same image is scanned by the scanner 10 a plurality of number of times, the image management system 1 notifies the user of the duplication of the scanned image, thus inhibiting duplicated accumulation of the image data.

Figure 2:
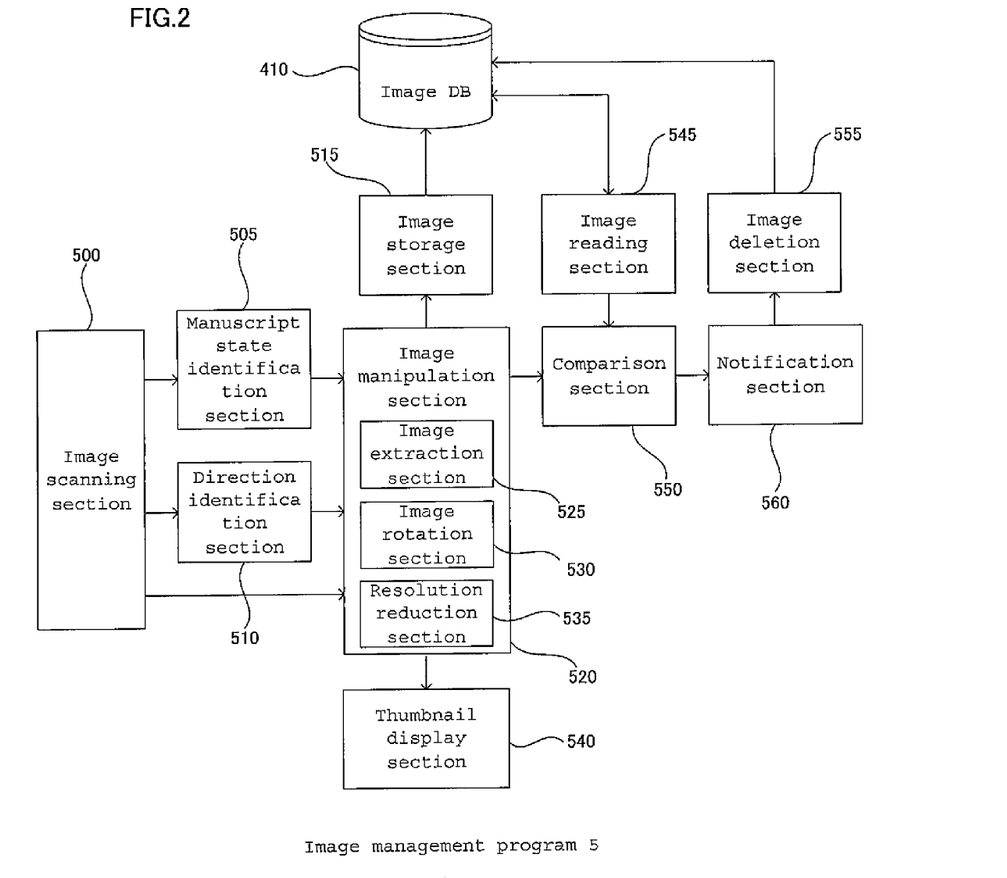
FIG. 2 is a diagram exemplifying a function configuration of an image management program 5.

FIG. 2 is a diagram exemplifying a function configuration of an image management program 5.

The user terminal 40 has the image management program 5 of FIG. 2 installed therein and, moreover, is provided with an image database 410 (image DB 410). It is to be noted that the scanner 10 may have the image management program 5 installed therein and may be provided with the image DB, instead.

The image management program 5 is recorded in a recording medium such as, for example, a CD-ROM beforehand and then installed in the user terminal 40 (FIG. 1) or the scanner 10 (FIG. 1) from the recording medium. It is to be noted that the image management program 5 may be partially or entirely installed in the user terminal 40 or the scanner 10 via a network. Further, the image management program 5 may be partially or entirely realized by hardware such as an ASIC mounted in the scanner 10.

As illustrated in FIG. 2, the image management program 5 has an image scanning section 500, a manuscript state identification section 505, a direction identification section 510, an image storage section 515, a manipulation section 520, a thumbnail display section 540, an image reading section 545, a comparison section 550, an image deletion section 555, and a notification section 560. Further, the manipulation section 520 includes an image extraction section 525, an image rotation section 530, and a resolution reduction section 535.

The image scanning section 500 controls an image scanning mechanism (the automatic feeder 100, an optical device, etc.) in the scanner 10 so that it may optically scan an image (manuscript image) displayed in the manuscript 9, thus creating data (image data) of the scanned image.

The manuscript state identification section 505 is one example of the medium state identification function and so identifies the state of a manuscript 9 disposed to the scanning position. The state of a manuscript refers to its state which may affect the scanning of an image and may include an inclination, layout, etc. of the manuscript.

The manuscript state identification section 505 of the present example identifies the position of a peripheral portion of a manuscript image in a scanned region of this image based on image data created by the image scanning section 500.

The direction identification section 510 is one example of the direction identification function and so identifies the direction of a content contained in image data scanned by the image scanning section 500, based on this image data. The direction of a content refers to an upward/downward direction or a rightward/leftward direction of a content displayed in an image and may include the upward/downward direction of characters or that of paintings or photos, etc.

The direction identification section 510 of the present example rotates image data scanned by the image scanning section 500 in a plurality of directions, performs OCR processing on the rotated images and an original image, and compares them in terms of, for example, character recognition rate, thereby identifying the direction of characters contained in the manuscript image.

The image storage section 515 stores comparison-target image data manipulated by the manipulation section 520 in a known recording region. The recording region may be that in the scanner 10 or that in the user terminal 40.

The image storage section 515 of the present example stores image data scanned by the image scanning section 500 and comparison-target image data manipulated by the manipulation section 520 in the image DB 410 in a condition where they are correlated with each other.

The manipulation section 520 is one example of the manipulating function and so manipulates image data scanned by the image scanning section 500 into comparison-target image data.

The manipulation section 520 of the present example includes the image extraction section 525, the image rotation section 530, and the resolution reduction section 535 and uses these functions to thereby create thumbnail display-target image data as comparison-target image data.

Specifically, the image extraction section 525 extracts a manuscript image from image data scanned by the image scanning section 500, based on a manuscript state identified by the manuscript state identification section 505. That is, the image extraction section 525 corrects the scanned image data in terms of inclination and position based on the respective inclination and position of the manuscript identified by the manuscript state identification section 505.

The image rotation section 530 rotates a manuscript image extracted by the image extraction section 525, based on a content direction identified by the direction identification section 510.

The resolution reduction section 535 performs resolution reduction processing on a manuscript image rotated by the image rotation section 530. The resolution reduction processing refers to, for example, processing of reducing a resolution to such a level as to be required by thumbnail display by use of a monitor.

The thumbnail display section 540 displays a thumbnail of image data scanned by the image scanning section 500, by using thumbnail display-target image data created by the manipulation section 520.

Figure 6A:
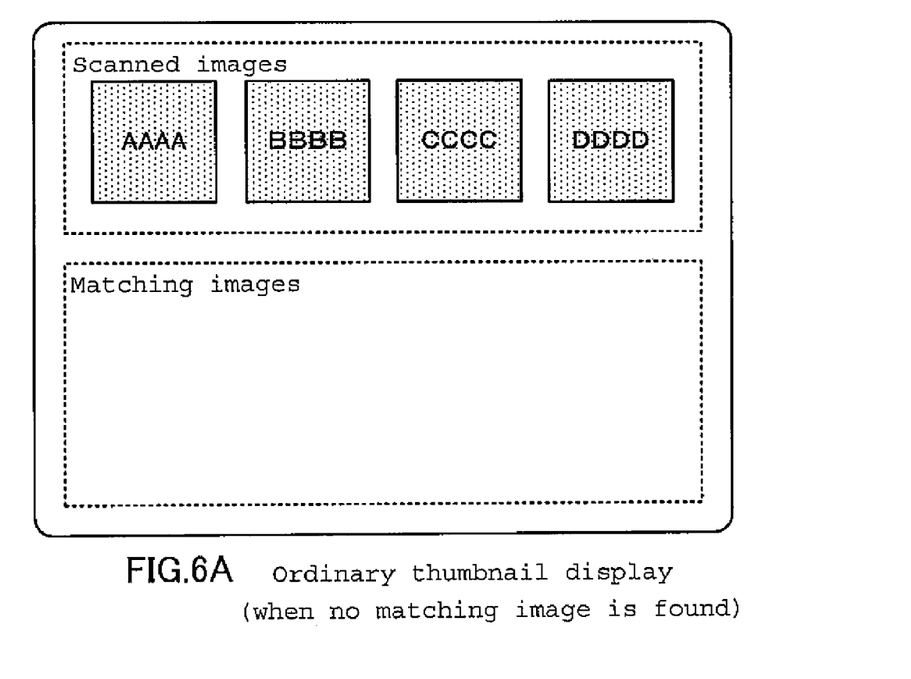
FIG. 6A is an illustration by example of ordinary thumbnail display (S150 in FIG. 4)

The thumbnail display section 540 of the present example displays a list of scaled-down manuscript images as illustrated in FIG. 6A.

The image reading section 545 sequentially reads comparison-target image data pieces from the image DB 410 and outputs them to the comparison section 550.

The comparison section 550 compares the image data scanned by the image scanning section 500 and that read by the image reading section 545.

The comparison section 550 of the present example compares the comparison-target image data manipulated by the manipulation section 520 and the comparison-target image data read by the image reading section 545 as shifting their relative position within a predetermined range, thus determining whether they agree.

In accordance with an instruction from the user, the image deletion section 555 deletes specified image data and the correlated comparison-target image data from the image DB 410.

The notification section 560 notifies the user depending on a result of the comparison by the comparison section 550. The user may be notified by display on a display device equipped to the scanner 10, an alarm sound produced from the scanner 10, or display by the user terminal 40.

Figure 6B:
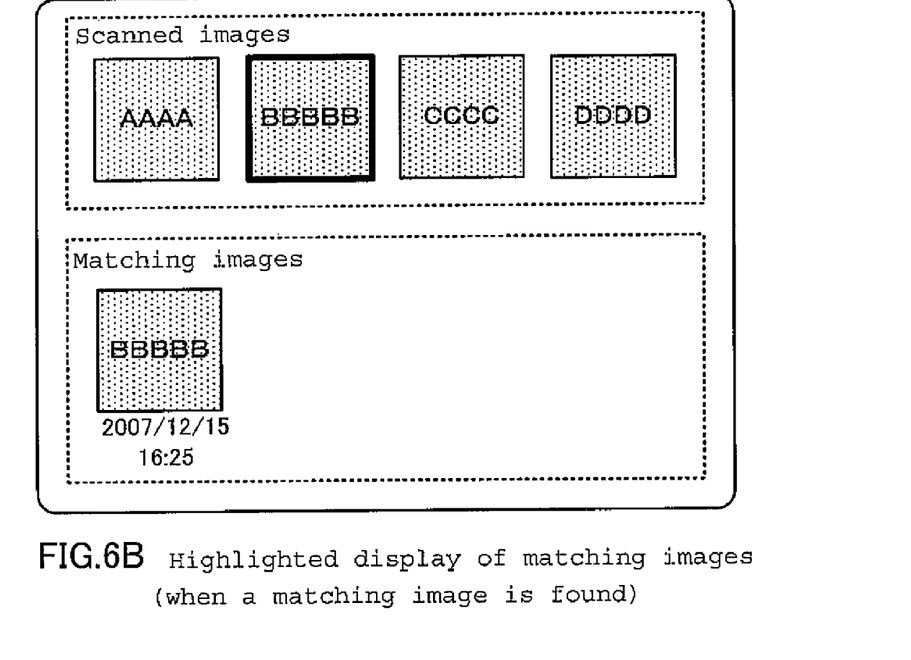
FIG. 6B is an illustration by example of thumbnail display (S145 in FIG. 4) which highlights images that agree with each other.

If some of the images are determined to agree with each other, the notification section 560 of the present example notifies the user of the presence of these images determined to agree with each other by highlighting their thumbnail-size images as illustrated in FIG. 6B.

Figure 3:
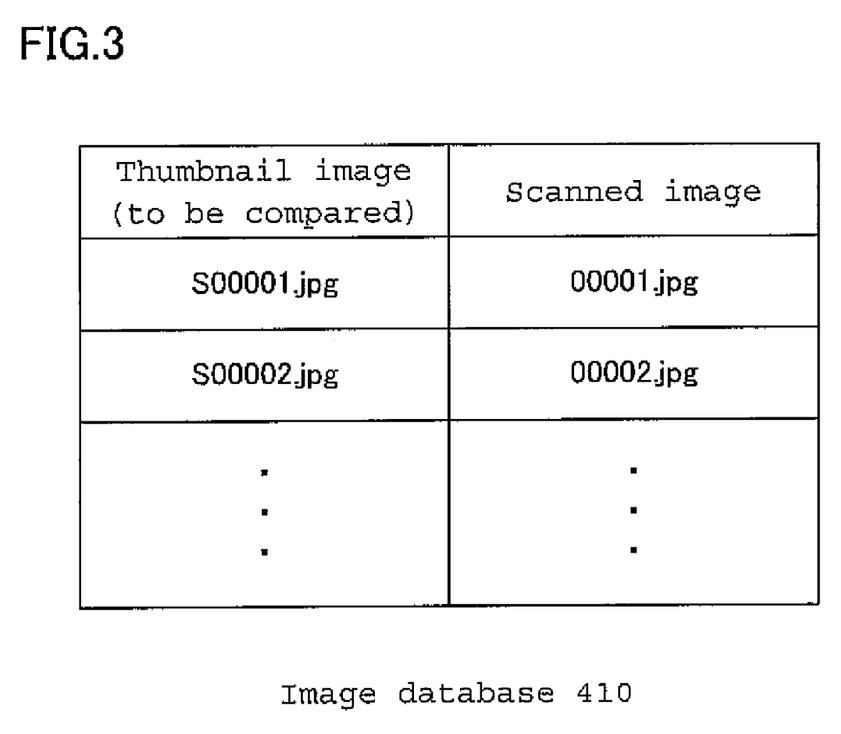
FIG. 3 is a table exemplifying data which is registered in an image DB 410.

FIG. 3 is a table exemplifying data which is registered in the image DB 410.

As shown in FIG. 3, image data scanned by the image scanning section 500 and comparison-target image data created on the basis of this image data are recorded in the image DB 410 in a condition where they are correlated with each other. The comparison-target image data of the present example is thumbnail display-target image data also, which has been created by the manipulation section 520.

Comparison-target image data is smaller in data size than original image data (that is, image data scanned by the image scanning section 500), thereby accelerating the comparison processing and the display processing.

Next, operations of the image management system 1 will be described below.

Figure 4:
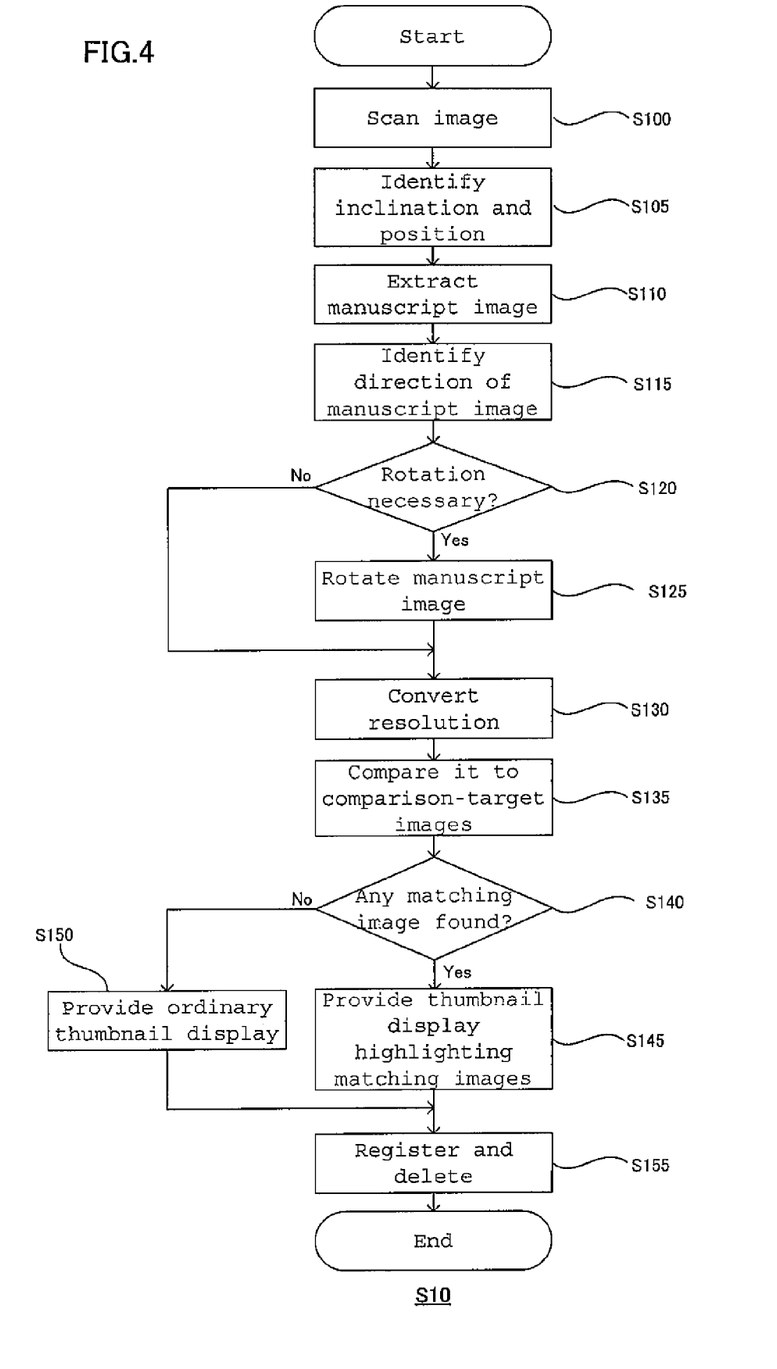
FIG. 4 is a flowchart explaining operations (S10) of a scanner 10 and the image management program 5.

FIG. 4 is a flowchart explaining the operations (S10) of the scanner 10 and the image management program 5.

As shown in FIG. 4, at step 100 (S100), if having detected a scanning request operation of the user, the image scanning section 500 (FIG. 2) controls the components of the scanner 10 so that an image may be scanned from the manuscript 9 which is set to the automatic feeder 100.

At step 105 (S105), the manuscript state identification potion 505 identifies the position of a peripheral portion of the manuscript image based on the image data scanned by the image scanning section 500.

At step 110 (S110), the image extraction section 525 extracts the manuscript image from the image scanned by the image scanning section 500, based on the position of the peripheral portion of the manuscript image identified by the manuscript state identification section 505. Thus, defects of the scanned image will be corrected which are caused by an inclination or displacement of the manuscript 9.

At step 115 (S115), the direction identification section 510 performs OCR processing on the data of the image scanned by the image scanning section 500 and its rotated images and compares them in terms of character recognition rate of each image, thereby identifying a direction of the manuscript image.

At step 120 (S120), the direction identification section 510 determines whether the manuscript image needs rotation processing. That is, if the character recognition rate is maximized in any of the rotated images, the direction identification section 510 determines that the manuscript image needs rotation processing, and if the character recognition rate is maximized in the non-rotational image, it determines that the manuscript image does not need rotation processing.

If it is determined that rotation processing is needed, the image management program 5 shifts to the processing of S125, and if it is determined that rotation processing is not needed, it shifts to the processing of S130.

At step 125 (S125), the image rotation section 535 rotates the manuscript image extracted by the image extraction section 525 in the direction identified by the direction identification section 510 (that is, a rotation direction in which the character recognition rate is maximized).

At step 130 (S130), the resolution reduction section 535 performs resolution reduction processing on the manuscript image extracted by the image extraction section 525 (manuscript image rotated by the image rotation section 535), thus creating image data for thumbnail display and comparison as well.

At step 135 (S135), the image reading section 545 reads comparison-target image data recorded in the image DB 410 (that is, comparison-target image data created earlier than this reading processing).

The comparison section 550 compares the comparison-target image data created by the manipulation section 520 and the comparison-target image data read by the image reading section 545.

At step 140 (S140), the comparison section 550 compares the comparison-target image data created by the manipulation section 520 (that is, data of the image scanned by the most recent scanning processing) and all the comparison-target image data pieces recorded in the image DB 410 (that is, data of the image scanned before), thereby determining whether there is a matching image data piece in the image DB 410.

If there is any matching image data in the DB 410, the image management program 5 shifts to the processing of S145, and if there is no matching image data in the DB 410, it shifts to the processing of S150.

At step 145 (S145), the thumbnail display section 540 displays thumbnails of the scanned images on the monitor of the user terminal 40 based on the comparison-target image data created by the manipulation section 520 as shown in FIG. 6B, while the notification section 560 highlights the matching images on the thumbnail display. Further, the notification section 560 of the present example displays scanned dates etc. of the matching images in a condition where they are correlated with thumbnail images as shown in FIG. 6B.

At step 150 (S150), the thumbnail display section 540 displays the thumbnail images on the user terminal 40 by using the comparison-target image data created by the manipulation section 520 as shown in FIG. 6A.

At step 155 (S155), the image storage section 515 newly registers the comparison-target image data created by the manipulation section 520 in the image DB 410.

On the other hand, the image deletion section 555 deletes specified image data from the image DB 410 in accordance with an instruction from the user.

FIG. 5 is a diagram describing comparison processing (S135) of FIG. 4.

Figure 5A:
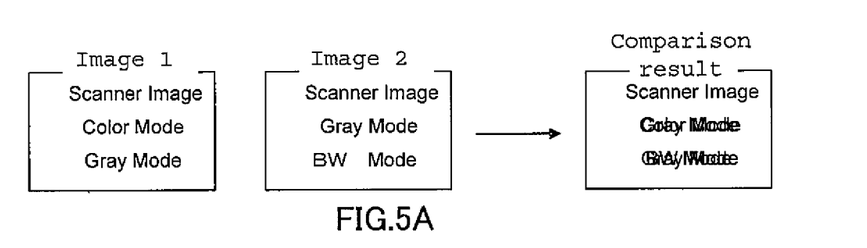
FIG. 5A to 5D is a diagram explaining comparison processing (S135) of FIG. 4.
Figure 5B:
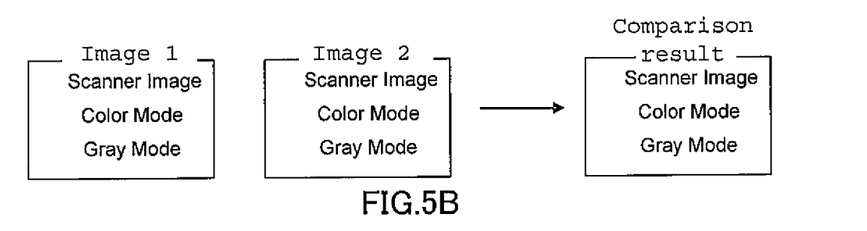

As show in FIG. 5A, the comparison section 550 compares the gradation value of each image region (pixel) on the manuscript image and determines whether a difference in gradation value is within an allowable range in all the image regions. Accordingly, in a case where there is a difference in content of the manuscript image as shown in FIG. 5A, the difference in gradation value goes out of the allowable range over the regions having the different contents, so that the comparison section 550 determines that the two image data pieces disagree with each other. On the other hand, in a case where the two image data pieces roughly agree with each other as shown in FIG. 5B, the difference in gradation value comes in the allowable range in all the image regions, so that the comparison section 550 determines that the image data pieces agree with each other. It is to be noted that even the data pieces of images scanned from the same manuscript may have different gradation values in some cases owing to irregular light quantities from a lamp in the scanner 10 or stain on an optical system, so that a known allowable range will be set for the differences in gradation value. The allowable range may be a fixed value or a variable value determined by referencing neighboring pixels.

Figure 5C:
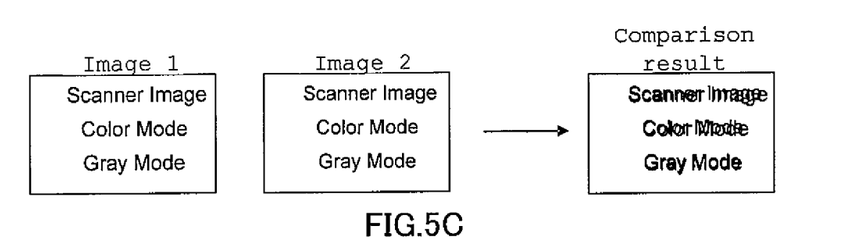
Figure 5D:
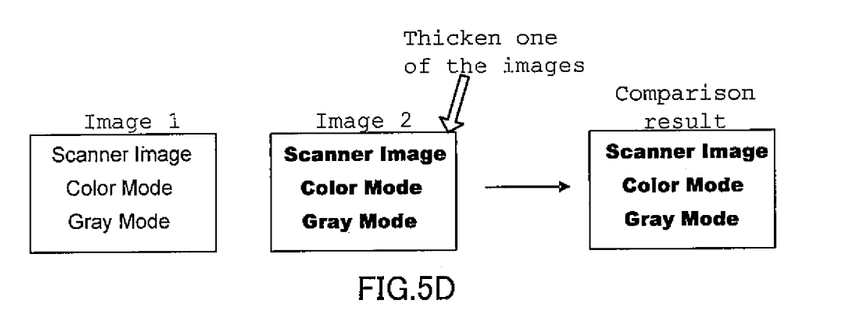

Further, as shown in FIG. 5C, there is a case where the difference in gradation value may go out of the allowable range owing to a distortion of the manuscript at the time of scanning, in which case the comparison section 550 determines that they disagree with each other. However, a minute distortion due to the setup of the manuscript etc. cannot be avoided. To solve this problem, the comparison section 550 of the present example thickens the significant pixel regions (regions other than a background color) of one of the two images as shown in FIG. 5D and determines whether the other image is contained in the thickened image; in such a manner, no matter which one of the two images is thickened, if the other image is contained in the thickened one, it determines that these images agree with each other.

It is to be noted that although the comparison section 550 of the present example has created a gray image (image made up of only luminance components) of each of the images and compares these gray images, the component images (R-component image, G-component image, and B-component image) of a color image may be compared to each other.

FIG. 6A illustrates ordinary thumbnail display (S150 in FIG. 4) and FIG. 6B illustrates thumbnail display (S145 in FIG. 4) which highlights images that agree with each other.

As shown in FIG. 6A, if a scanning request operation is given in a condition where a plurality of manuscripts are set to the automatic feeder 100, the scanner 10 scans image data from each of these manuscripts and creates a thumbnail-size image from each of the scanned image data pieces and then displays a list of these thumbnail-size images on the user terminal 40.

In such a manner, if any one of successively scanned image data pieces agrees with the image data scanned in the past, as shown in FIG. 6B, the notification section 560 displays a thumbnail-size image (image displayed as "BBBBB" in the present example) of the scanned image containing the matching one in a different style from the other thumbnail-size images.

Moreover, it displays the thumbnail-size images of the matching images (similar images registered in the image DB 410) and dates on which they were scanned. This enables the user to compare a thumbnail-size image highlighted by a thickened frame (most recently scanned image) and similar images scanned earlier than that, thereby determining whether these images are necessary.

As described above, by the image management system 1 of the present embodiment, a newly scanned image can be compared to the images scanned earlier than that, to determine whether it is scanned from the same manuscript. By notifying the user of a result of this determination, it may be expected to inhibit redundancy in image data accumulated in the image management system 1.

Further, in the present embodiment, the target for management has been the image data scanned by the scanner 10 rather than the image data picked up by a digital camera, so that it is more desirable to directly compare the gradation values of the entire image than to compare the feature quantity for each image region. This is because, in the case of a document manuscript etc. scanned by the scanner 10, only part of its formatted document may be edited in many cases, so that different documents might possibly be determined to be the same one by comparison of the feature quantities.

[Variant 1]

Next, variants of the above embodiment will be described below.

In contrast to the embodiment in which all the images scanned by the scanner 10 in the past have been compared, the first variant compares image data pieces before and after the occurrence of a scanning mistake. That is, in the present variant, image data created by rescanning after the occurrence of a scanning mistake (mistake in scanning) is compared to image data scanned by a scanning request that has caused the scanning mistake.

Figure 7:
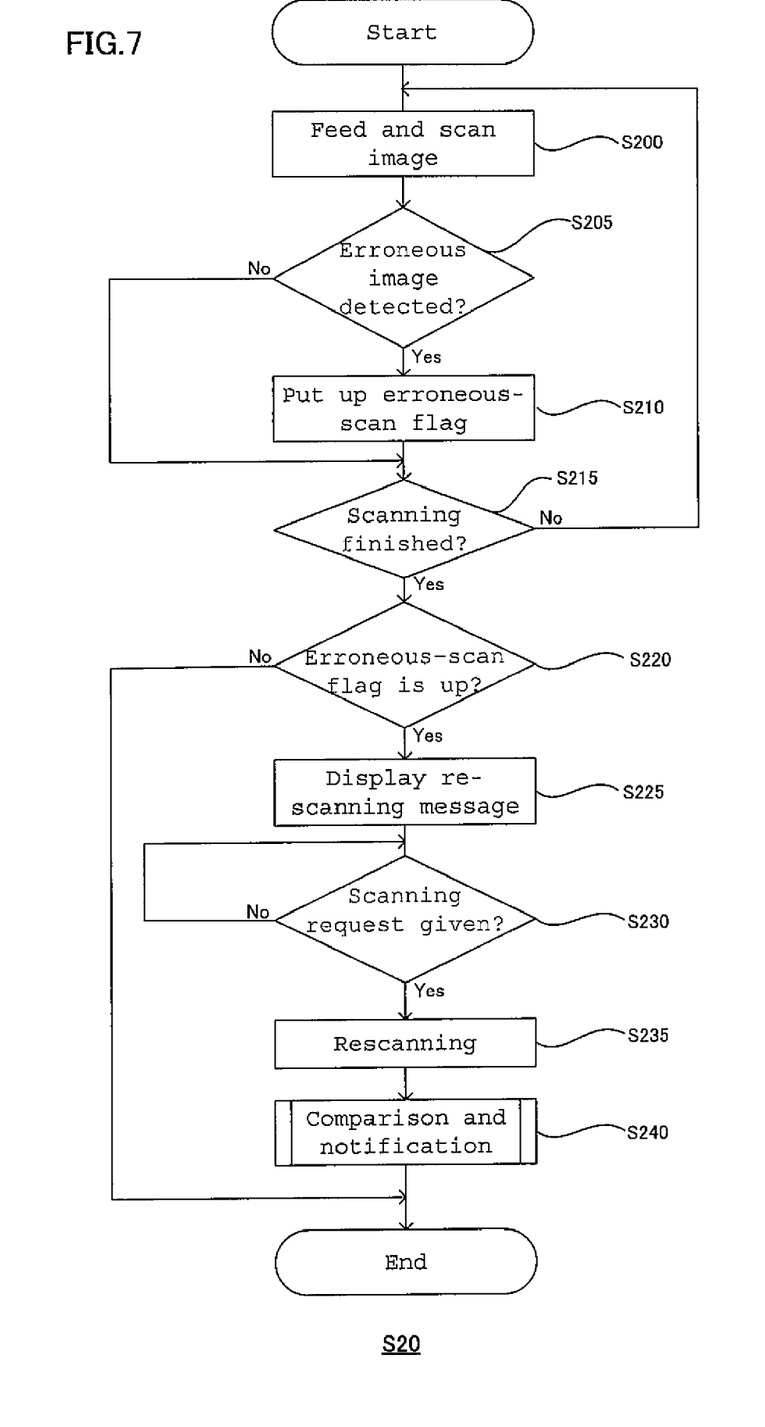
FIG. 7 is a flowchart explaining operations (S20) of the scanner 10 in a first variant.

FIG. 7 is a flowchart explaining the operations (S20) of the scanner 10 in the first variant.

As shown in FIG. 7, at step 200 (S200), if having detected a scanning request operation of the user, the image scanning section 500 (FIG. 2) controls the components of the scanner 10 so that the first sheet of paper of the manuscript 9 set to the automatic feeder 100 may be fed to the scanning position in order to scan images from the manuscript 9.

At step 205 (S205), the manuscript state identification potion 505 determines the occurrence of a scanning mistake based on the image data scanned by the image scanning section 500. The images determined to be of the mistake in scanning may include, for example, an images scanned from the manuscript in a condition where part of it is folded or it is displaced greatly from the scanning position, which mistakes in scanning can be identified based on, for example, the position of the peripheral portion of the scanned manuscript image.

If having determined the occurrence of a scanning mistake, the image management program 5 shifts to the processing of S210, and if having determined the nonoccurrence of a scanning mistake, it shifts to the processing of S215.

At step 210 (S210), the manuscript state identification section 505 puts up an erroneous-scan flag that indicates the occurrence of a scanning mistake.

At step 215 (S215), the image scanning section 500 determines whether there is not the manuscript set to the automatic feeder 100 any more.

If having determined that the manuscript still remains, the image management program 5 returns to the processing of S200 to process the next manuscript, and if having determined that there is not the manuscript anymore, it shifts to the processing of S220. In such a manner, the present variant is based on the assumption that the manuscripts are scanned successively by using the automatic feeder 100.

At step 220 (S220), the manuscript state identification section 505 determines whether the erroneous-scan flag is up. That is, if successive scanning responding to one scanning request is completed, the manuscript state identification section 505 determines whether a scanning mistake has occurred in this series of scanning processing.

If the erroneous-scan flag is up, the image management program 5 returns to the processing of S225, and if the erroneous-scan flag is not up, it ends the operations (S20).

At 225 (S225), the manuscript state identification section 505 (scanning mistake notification function) displays a rescanning message on the monitor of the scanner 10, thus prompting the user to rescan the manuscript.

At step 230 (S230), the image management program 5 waits until a scanning request operation of the user is detected, and shifts to the processing of S235 if it is detected.

At step 235 (S235), the image management program 5 performs rescanning processing in accordance with the scanning request operation. The rescanning processing is essentially the same as the processing of S200 to S230.

At step 240 (S240), the image management program 5 performs comparison processing on each of image data pieces scanned by the rescanning processing and each of image data pieces scanned by the scanning processing immediately preceding this rescanning processing (that is, the scanning processing in which the scanning mistake occurred) and then performs notification processing, which comparison processing is essentially the same as the processing of S105 to S140 and which notification processing is essentially the same as the processing of S145 to S155 of FIG. 4.

If rescanning is thus performed owing to the occurrence of a scanning mistake, image data may likely be scanned redundantly, so that such a case should preferably be taken into account to detect and notify of redundant images.

[Variant 2]

Next, the second variant will be described below.

Figure 8:
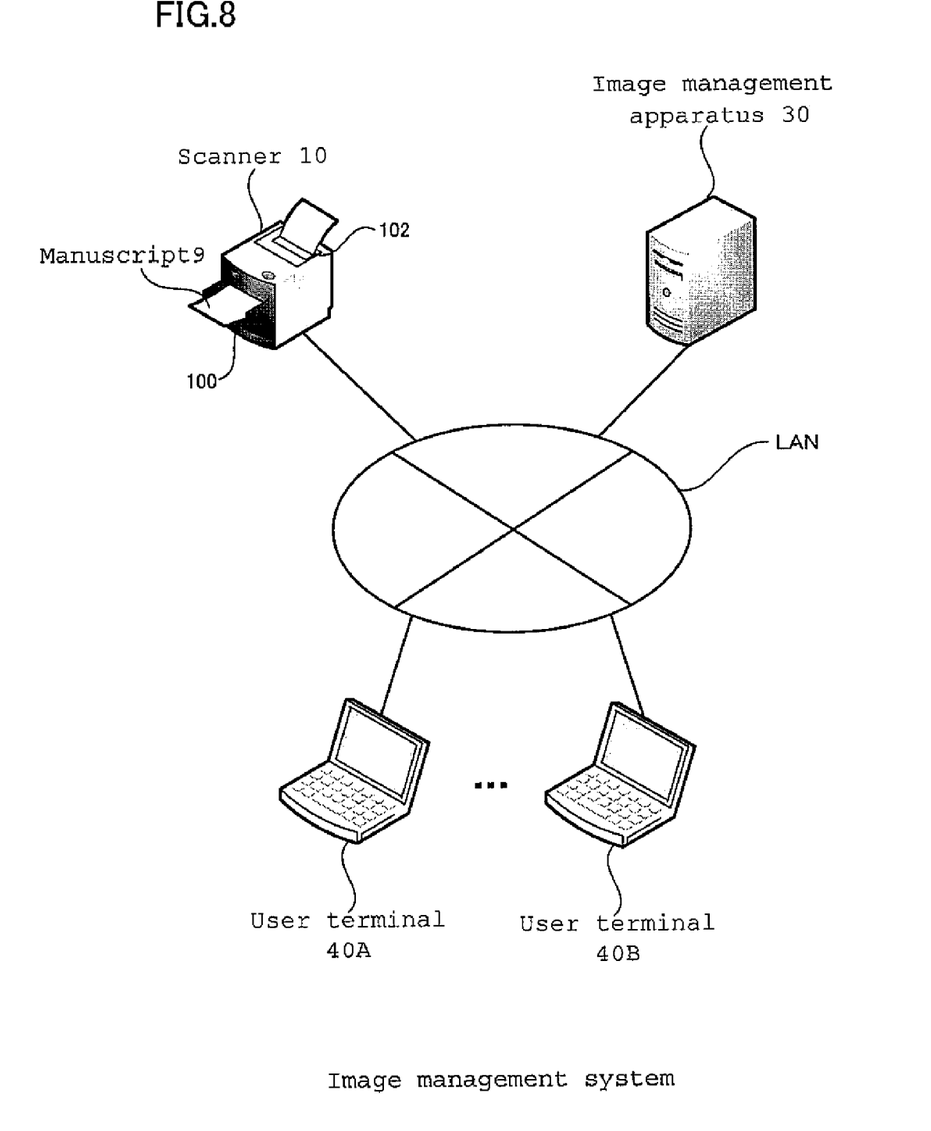
FIG. 8 is an illustration by example of an overall constitution of the image management system in a second variant.

FIG. 8 is an illustration by example of an overall constitution of the image management system 1 in the second variant.

In contrast to the above-described embodiment in which all the functions of the image management program 5 have been installed in the user terminal 40, the second variant will be described with reference to an aspect of dividing the functions of the image management program 5 to the scanner 10 and an image management apparatus 30 as shown in FIG. 8.

The image management apparatus 30 may be, for example, a server apparatus and accumulates and manages image data scanned by the scanner 10 and, in response to a request from the user terminal 40, provides the accumulated and managed image data to the user terminal 40.

Figure 9:
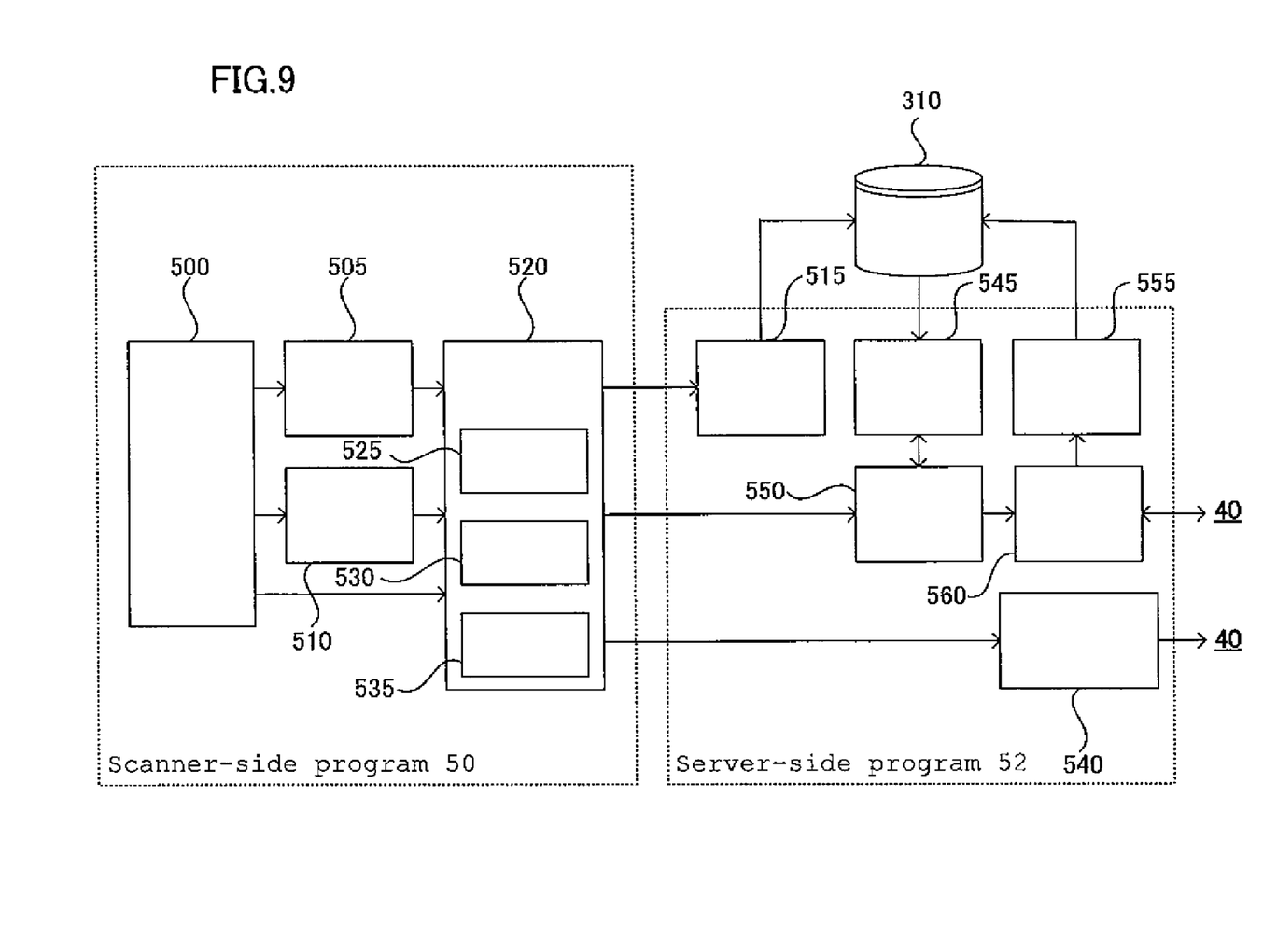
FIG. 9 is a diagram exemplifying a function constitution of the scanner 10 and that of an image management apparatus 30 in the second variant.

FIG. 9 is a diagram illustrating a function constitution of the scanner 10 and that of the image management apparatus 30 in the second variant. It is to be noted that identical reference numerals are given to the essentially identical components in the present figure and FIG. 2.

As shown in FIG. 9, a scanner-side program 50 is installed in the scanner 10, while a server-side program 52 is installed in the image management apparatus 30. Further, the image management apparatus 30 is provided with an image database 310 (image DB 310).

The functions may be thus divided to the scanner 10 and the image management apparatus 30.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image scanning apparatus comprising:
    a scanning unit that scans an image from an image display medium optically and creates image data;
    a data comparison unit that compares the image data scanned by the scanning unit and image data recorded in a predetermined recording region;
    a notification unit that notifies an operator depending on a result of comparison by the data comparison unit;
    a manipulation unit that manipulates the image data scanned from the display medium into comparison-target image data; and a storage unit that stores the comparison-target image data manipulated by the manipulation unit in the recording region, wherein the data comparison unit compares the image data manipulated by the manipulation unit and the image data stored in the recording region.

2. The image scanning apparatus according to claim 1, further comprising:

a medium state identification unit that identifies a state of the image display medium from which an image is scanned, wherein the manipulation unit manipulates the image data scanned from the image display medium based on the state of the image display medium identified by the medium state identification unit.

3. The image scanning apparatus according to claim 1, further comprising:

a direction identification unit that identifies a direction of a content contained in the image data scanned from the image display medium based on this image data, wherein the manipulation unit manipulates the image data scanned from the image display medium into the comparison-target image data based on the direction of the content identified by the direction identification unit.

4. The image scanning apparatus according to claim 1, wherein:

the manipulation unit performs resolution reduction processing on the image data scanned from the image display medium to thereby manipulate it into the comparison-target image data; and the data comparison unit compares the image data on which the resolution reduction processing has been performed by the manipulation unit.

5. The image scanning apparatus according to claim 1, wherein:

the manipulation unit creates thumbnail display-target image data based on the image data scanned from the image display medium;

the data comparison unit compares the thumbnail display-target image data created by the manipulation unit; and the image scanning apparatus further comprises:

a thumbnail display unit that displays a thumbnail by using the thumbnail display-target image data created by the manipulation unit.

6. The image scanning apparatus according to claim 1, wherein:

the data comparison unit performs comparison by shifting a relative position of the image data read from the recording region with respect to the image data scanned from the image display medium within a predetermined range and, if a difference between these image data pieces at any one of the relative positions falls in a predetermined allowable range, determines that these image data pieces agree with each other; and if the data comparison unit determines that the image data pieces agree with each other, the notification unit notifies of image duplication.

7. The image scanning apparatus according to claim 1, further comprising:

a scanning mistake notification unit that notifies an operator of occurrence of a scanning mistake in scanning processing of scanning the image from the image display medium, wherein the data comparison unit compares the image data scanned in response to a scanning request which is given immediately after notification by the scanning mistake notification unit and the image data scanned in response to a scanning request which is given immediately before this notification.

8. The image scanning apparatus according to claim 1, further comprising:

a scanning mistake notification unit that notifies an operator of occurrence of a scanning mistake in image scanning processing, wherein if notification is performed by the scanning mistake notification unit, the data comparison unit compares the image data.

9. The image scanning apparatus according to claim 7, further comprising:

a matching image display unit that, if any one of the image data pieces scanned in response to the scanning request which is given immediately after notification agrees with any one of the image data pieces scanned in response to the scanning request which is given immediately before the notification, displays the image data determined to be matching in a style different from the other image data pieces.

10. An image management system comprising:

an image scanning apparatus and an image management apparatus, wherein:

the image scanning apparatus optically scans an image from an image display medium and creates image data; and the image management apparatus includes:

a data comparison unit that compares the image data scanned by the scanning apparatus and image data recorded in a predetermined recording region;

a notification unit that notifies an operator depending on a result of comparison by the data comparison unit;

a manipulation unit that manipulates the image data scanned from the display medium into comparison-target image data; and a storage unit that stores the comparison-target image data manipulated by the manipulation unit in the recording region, wherein the data comparison unit compares the image data manipulated by the manipulation unit and the image data stored in the recording region.

11. An image management system comprising:

the image scanning apparatus of claim 1 and an image management apparatus.

* * * * *